(12) United States Patent
Park

(10) Patent No.: US 10,090,734 B2
(45) Date of Patent: Oct. 2, 2018

(54) ELECTRICITY GENERATION SYSTEM USING TIRE DEFORMATION

(71) Applicant: Gye Jeung Park, Daegu (KR)

(72) Inventor: Gye Jeung Park, Daegu (KR)

(*) Notice: Subject to any disclaimer, the term of this patent is extended or adjusted under 35 U.S.C. 154(b) by 0 days.

(21) Appl. No.: 15/535,411

(22) PCT Filed: Jan. 8, 2016

(86) PCT No.: PCT/KR2016/000159
§ 371 (c)(1),
(2) Date: Jun. 13, 2017

(87) PCT Pub. No.: WO2016/111570
PCT Pub. Date: Jul. 14, 2016

(65) Prior Publication Data
US 2017/0338719 A1 Nov. 23, 2017

(30) Foreign Application Priority Data

Jan. 9, 2015 (KR) .................. 10-2015-0003288

(51) Int. Cl.
| | |
|---|---|
| *H02K 7/18* | (2006.01) |
| *B60L 11/18* | (2006.01) |
| *F16H 19/06* | (2006.01) |
| *F16H 31/00* | (2006.01) |
| *B60C 19/00* | (2006.01) |

(52) U.S. Cl.
CPC ......... *H02K 7/1846* (2013.01); *B60C 19/00* (2013.01); *B60L 11/1812* (2013.01); *F16H 19/06* (2013.01); *F16H 31/001* (2013.01); *H02K 7/1861* (2013.01)

(58) Field of Classification Search
CPC ..... H02K 7/1846; H02K 7/1861; B60C 19/00
USPC ........................................ 290/1 R
See application file for complete search history.

(56) References Cited

U.S. PATENT DOCUMENTS

| | | | | |
|---|---|---|---|---|
| 6,809,426 B2* | 10/2004 | Naar | ...................... | B60K 25/08 180/302 |
| 8,324,772 B2* | 12/2012 | Barbar | ................. | H02K 7/1876 290/1 A |
| 8,853,869 B2* | 10/2014 | Nikolic | ................ | H02K 7/1846 290/1 R |
| 2011/0042966 A1* | 2/2011 | Kim | ...................... | B60K 25/08 290/1 C |
| 2016/0233755 A1* | 8/2016 | Bayrakdar | ............. | H02K 53/00 |

(Continued)

FOREIGN PATENT DOCUMENTS

| | | |
|---|---|---|
| KR | 10-2008-0008283 A | 1/2008 |
| KR | 10-0807843 B1 | 3/2008 |

(Continued)

OTHER PUBLICATIONS

International Search Report for PCT/KR2016/000159 dated Apr. 22, 2016 from Korean Intellectual Property Office.

*Primary Examiner* — Viet Nguyen
(74) *Attorney, Agent, or Firm* — Revolution IP, PLLC

(57) ABSTRACT

An electricity generation system using tire deformation comprises driving mechanisms converting deformation of a tire into a driving force; and an electricity generation mechanism generating electricity using the driving force converted by the driving mechanisms, wherein the driving mechanisms convert only deformation due to expansion after compression of the tire into the driving force.

9 Claims, 8 Drawing Sheets

(56) References Cited

U.S. PATENT DOCUMENTS

2018/0065278 A1\* 3/2018 Park .................... B29C 35/0288
2018/0065331 A1\* 3/2018 Park ....................... B29D 30/04

FOREIGN PATENT DOCUMENTS

| KR | 10-0884108 B1 | 2/2009 |
| KR | 10-0922988 B1 | 10/2009 |
| KR | 10-2013-0054083 A | 5/2013 |
| KR | 10-1431979 B1 | 8/2014 |

\* cited by examiner the traveling direction of the vehicle

ELECTRICITY GENERATION SYSTEM USING TIRE DEFORMATION

CROSS REFERENCE TO PRIOR APPLICATIONS

This application is a National Stage Application of PCT International Patent Application No. PCT/KR2016/000159 filed on Jan. 8, 2016, under 35 U.S.C. § 371, which claims priority to Korean Patent Application No. 10-2015-0003288 filed on Jan. 9, 2015, which are all hereby incorporated by reference in their entirety.

TECHNICAL FIELD

The present invention relates to an electricity generation system that can generate electricity using deformation of a tire that occurs while a vehicle is driven to charge a battery or operate an electric motor. In particular, the present invention relates to an electricity generation system using tire deformation, the system being able to efficiently generate electricity without deteriorating the driving performance of a vehicle by converting deformation of the tire due to compression and expansion into a reciprocating motion and a rotary motion for driving force, particularly, by converting only expansion after compression of a tire into a driving force while a vehicle is driven.

BACKGROUND ART

Unlike vehicles equipped with an internal combustion engine that generates power using fuel such as gasoline, diesel, or LP gas, an electric vehicle (including a hybrid vehicle) is driven by operating the wheels using electrical energy from a battery charged with electrical energy. Such an electric vehicle is an eco-friendly vehicle because it does not generate pollution such as noxious gases, noise, and dust that are generated by internal combustion engines, so many studies about electric vehicles have been conducted.

An electric vehicle (including a hybrid vehicle) includes a battery keeping electrical energy and runs using the electrical energy stored in the battery. When the electrical energy stored in the battery is consumed, it is required to recharge the battery to drive the vehicle. In the case of vehicles with an internal combustion engine, it is possible to supply fuel to easily at any time when the fuel is consumed since there are many gas stations for supplying fuel such as gasoline, diesel, or LP gas. However, at present there are not many recharging stations that supply electrical energy. Accordingly, it is difficult to keep driving electric vehicles when the electrical energy of the battery is exhausted while driving.

Meanwhile, a large amount of electrical energy is needed for driving electric vehicles. However, the batteries in electric vehicles are necessarily limited in weight and volume, so the batteries cannot be charged with a large amount of electrical energy. As disclosed in the following Patent Document, existing electric vehicles use only the electrical energy stored in a battery and have no system that generates electricity and charges a battery using energy that is generated while driving. Further, the amounts of electrical energy that can be supplied to batteries are limited. Accordingly, it is impossible to drive a long distance with existing electric vehicles.

PATENT DOCUMENT

Korean Patent Application Publication No. 10-2013-0054083 (published on 24 May 2013), titled "Electric vehicle using separable electric battery)

Further, vehicles with an internal combustion engine take not much time to be filled with fuel, so they can be fueled within a short time. However, as for batteries, the larger the amount of electrical energy to charge batteries, the more the time for charging the batteries with the electrical energy is taken. Accordingly, users have to charge the batteries for a long time every time they drive, so it is problematic in terms of commercialization.

Therefore, the present invention has been made to basically solve the problems with charging the batteries of electric vehicles (including hybrid vehicles) or internal combustion engine vehicles, and driving the vehicles.

DISCLOSURE

Technical Problem

The present invention has been made in an effort to solve the problems.

Thus, an object of the present invention is to provide an electricity generation system using tire deformation, the system generating electricity using tire deformation that occurs while a vehicle is driven in order to charge a battery or operate an electric motor.

Another object of the present invention is to provide an electricity generation system using tire deformation, the system converting deformation of the tire due to compression and expansion into a reciprocating motion and a rotary motion for driving force.

A further object of the present invention is to provide an electricity generation system using tire deformation, the system being able to efficiently generate electricity without deteriorating the driving performance of a vehicle by converting only expansion after compression of a tire into a driving force while a vehicle is driven.

Yet another object of the present invention is to provide an electricity generation system using tire deformation in which a first winding portion and a second winding portion of a load-driven rotor for fixing and winding first and second end of a load transmission member wind the load transmission member in the same direction so that the load-driven rotor reduces the gap between the spike and the load-driven rotor with the load transmission member tensed by winding the load transmission member by rotating always in the same direction when the tire compresses.

Still another object of the present invention is to provide an electricity generation system using tire deformation in which an elastic member that compresses when the tire expands and the load transmission member rotates the load-driven rotor in a second direction provides torque for rotating the load-driven rotor in a first direction by elastically returning when the tire compresses.

Still another object of the present invention is to provide an electricity generation system using tire deformation in which a first winding portion and a second winding portion can wind the load transmission member even though a spike and a load-driven rotor come close to each other, thereby preventing damage to a spike, a rotary unit, or a electricity generation mechanism even if the tire is punctured.

Still another object of the present invention is to provide an electricity generation system using tire deformation in which the rotational speed of a second rotary gear is increased by making a diameter of the second rotary gear, which is rotated by torque from a first rotary gear to transmit a driving force to the electricity generation mechanism, larger than a diameter of the first rotary gear that rotates with the load-driven rotor.

Technical Solution

An electricity generation system using tire deformation for achieving the objects of the present invention includes the following configurations.

An electricity generation system using tire deformation according to an embodiment of the present invention includes: driving mechanisms converting deformation of a tire into a driving force; and an electricity generation mechanism generating electricity using the driving force converted by the driving mechanisms, in which the driving mechanisms convert only deformation due to expansion after compression of the tire into the driving force.

The driving mechanisms each may include: a spike coupled to the tire to operate with defamation of the tire; a load transmission member transmitting a motion of the spike to a rotary unit; and the rotary unit transmitting a driving force to the electricity generation mechanism by rotating with the motion of the spike transmitted through the load transmission member.

The rotary unit may transmit a driving force to the electricity generation mechanism through a rotary gear set that is not operated with a motion of the spike when the tire compresses, but is operated by a motion of the spike only when the tire expands.

The rotary unit may include a load-driven rotor coupled to a first end of the load transmission member to rotate in two directions with the load transmission member and a rotary gear set engaged with the load-driven rotor to rotate together; the rotary gear set may include a first rotary gear rotating with the load-driven rotor and a second rotary gear rotated by torque from the first rotary gear; and the first rotary gear may not rotate the second rotary gear when the tire compresses and the load-driven rotor is rotated with the load transmission member, but may rotate with the second rotary gear when the tire expands and the load-driven rotor is rotated with the load transmission member.

A one-way bearing may be disposed between the first rotary gear and the second rotary gear, so when the first rotary gear rotates in a first direction, the second rotary gear does not rotate, but when the first rotary gear rotates in a second direction, the second rotary gear also rotates with the first rotary gear.

The load transmission member may be a load transmission wire that is wound around the spike with a first end fixed to a first side of the load-driven rotor and a second end fixed to a second side of the load-driven rotor.

The spike may include a wire support that allows the load transmission wire wound around the spike to be easily turned and pulled by the spike when the tire expands, and the load-driven rotor may have a first winding portion and a second wing portion formed at both sides of a gear portion at a center thereof to fix and wind the first end and the second end of the load transmission wire.

The first end of the load transmission wire may be fixed to and wound in a first direction around the first winding portion and the second end of the load transmission wire may be fixed to and wound in the first direction around the second winding portion, so when the tire compresses, the load-driven rotor may rotate always in the same direction and may wind the load transmission wire to reduce a gap between the spike and the load-driven rotor with the load transmission wire tensed.

The load-driven rotor may include an elastic member that provides torque so that the load-driven rotor can wind the load transmission wire by rotating in the first direction when the tire compresses.

The elastic member may compress when the tire expands and the load transmission wire rotates the load-driven rotor in the second direction, and may rotate the load-driven rotor in the first direction by elastically returning when the tire compresses.

The first winding portion and the second winding portion may wind the load transmission wire even though the spike and the load-driven rotor come close to each other, thereby preventing damage to the spike, the rotary unit, or the electricity generation mechanism even if the tire is punctured.

The first rotary gear and the second rotary gear may be arranged on one rotary shaft, and the rotational speed of the second rotary gear may be increased by making a diameter of the second rotary gear, which is rotated by torque from the first rotary gear to transmit a driving force to the electricity generation mechanism, larger than a diameter of the first rotary gear that rotates with the load-driven rotor.

Advantageous Effects

The present invention can obtain the following effects from the embodiments, and the configurations and combination and use relationships to be described below.

It is possible to generate electricity using deformation of a tire that occurs while a vehicle is driven, and charge a battery or operate an electric motor.

It is possible to obtain a driving force by converting deformation due to compression and expansion of a tire into a reciprocating motion and a rotary motion.

It is possible to efficiently generate electricity without deteriorating the driving performance of a vehicle by converting only expansion after compression of a tire into a driving force while a vehicle is driven.

The first winding portion and the second winding portion of a load-driven rotor for fixing and winding first and second end of a load transmission member wind the load transmission member in the same direction, so that the load-driven rotor can reduce the gap between the spike and the load-driven rotor with the load transmission member tensed by winding the load transmission member by rotating always in the same direction when the tire compresses.

The elastic member that compresses when the tire expands and the load transmission member rotates the load-driven rotor in a second direction provides torque for rotating the load-driven rotor in a first direction by elastically returning when the tire compresses The first winding portion and the second winding portion can wind the load transmission member even though a spike and a load-driven rotor come close to each other, thereby preventing damage to the spike, the rotary unit, or the electricity generation mechanism even if the tire is punctured.

The rotational speed of a second rotary gear is increased by making a diameter of the second rotary gear, which is rotated by torque from a first rotary gear to transmit a driving force to the electricity generation mechanism, larger than a diameter of the first rotary gear that rotates with the load-driven rotor.

Figure 1:
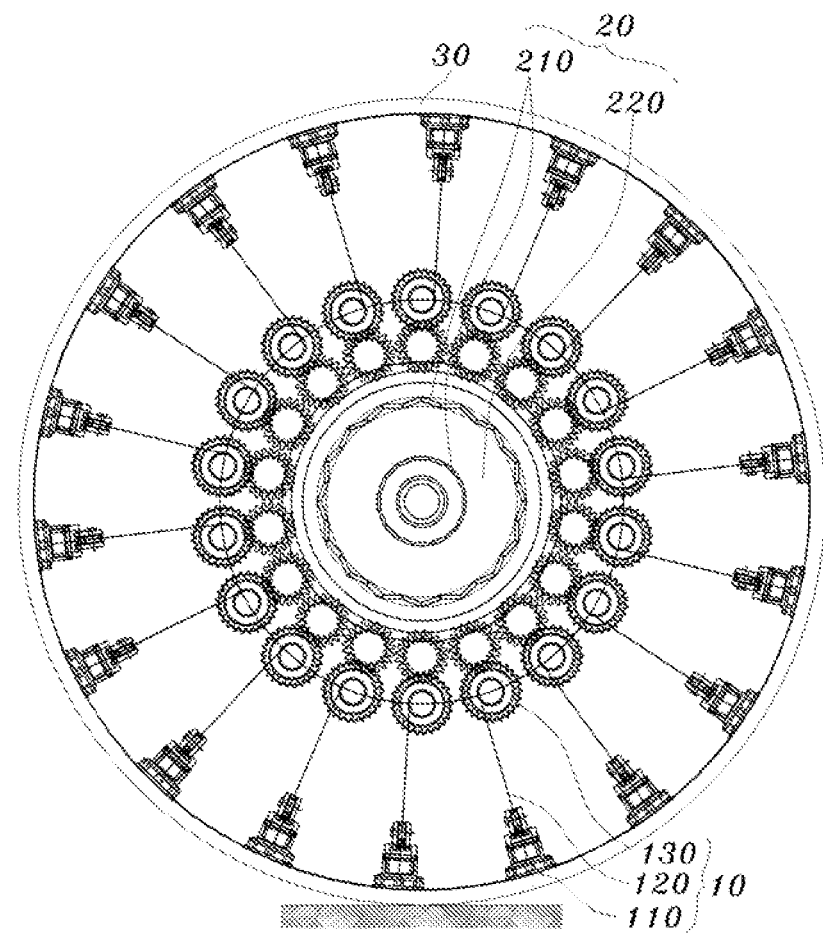
FIG. 1 is a horizontal cross-sectional view of an electricity generation system using tire information according to an embodiment of the present invention.

| Reference Numerals | |
|---|---|
| 10: Driving mechanism | 110: Spike |
| 111: Wire support | 120: Load transmission member |
| 130: Rotary unit | 131: Load-driven rotor |
| 1311: Gear portion | 1312: First winding portion |
| 1313: Second winding portion | |
| 1314: Elastic member | |
| 132: Rotary gear seat | |
| 1321: First rotary gear | |
| 1322: Second rotary gear | |
| 1323: One-way bearing | |
| 20: Electricity generation mechanism | |
| 210: Permanent magnet | |
| 220: Coil | 30: Tire |

BEST MODE

Hereinafter, an exemplary embodiment of an electricity generation system using tire deformation according to the present invention will be described with reference to the accompanying drawings. In describing the present invention, well-known functions or constructions will not be described in detail since they may unnecessarily obscure the understanding of the present invention. Further, throughout the specification, unless explicitly described otherwise, "comprising" any components will be understood to imply the inclusion of other components rather than the exclusion of any other components.

Referring to FIGS. 1 to 8, an electricity generation system using tire deformation according to an embodiment of the present invention may include driving mechanisms 10 that convert deformation of a tire 30 into a driving force; and an electricity generation mechanism 20 that generates electricity using the driving force obtained by the driving mechanism 10.

The electricity generation mechanism 20, which is provided to generate electricity using a driving force from the driving mechanism 10, generates electricity, for example, using interaction between permanent magnets 210 and a coil 220 (that is, a principle that any one of the permanent magnets 210 and the coil generate an induced electromotive force by rotating) based on torque from rotary units 130 to be described below.

The driving mechanism 10 is provided to convert deformation of the tire 30 that occurs while a vehicle (including mobile machines equipped with tires such as a bicycle, a passenger car, and a truck) is driven into a driving force. The tire 30 a vehicle periodically repeats deforming while the vehicle is driven. That is, while the vehicle is driven, the surface of the tire 30 that comes in contact with the ground is compressed by the weight of the vehicle etc., while the surface of the tire 30 that has been in contact with the ground is expanded back into the initial state by the internal air pressure of the tire 30 after coming off the ground by rotating, whereby the tire 30 repeats compressing and expanding while the vehicle is driven. The electricity generation system of the present invention converts deformation of the tire 30, which repeats compressing and expanding while a vehicle is driven, into a driving force using the driving mechanism 10 and generates electricity from the driving force using the electricity generation mechanism 20 in order to use the electricity for charging the battery of internal combustion engine vehicles, particularly, the battery of electric vehicles (including hybrid vehicles).

In particular, the driving mechanism 10 can generate a driving force by converting deformation due to compression and expansion of the tire 30 into a reciprocating motion and a rotating motion. To this end, as shown in FIG. 1, etc., the driving mechanism 10 may include a spike 110 coupled to the tire 30 to operate with deformation of the tire 30, a load transmission member 120 that transmits motion of the spike 110 to a rotary unit 130, and the rotary unit 130 that transmits a driving force to the electricity generation mechanism 20 by rotating with the motion of the spike 110 transmitted through the load transmission member 120.

Figure 2:
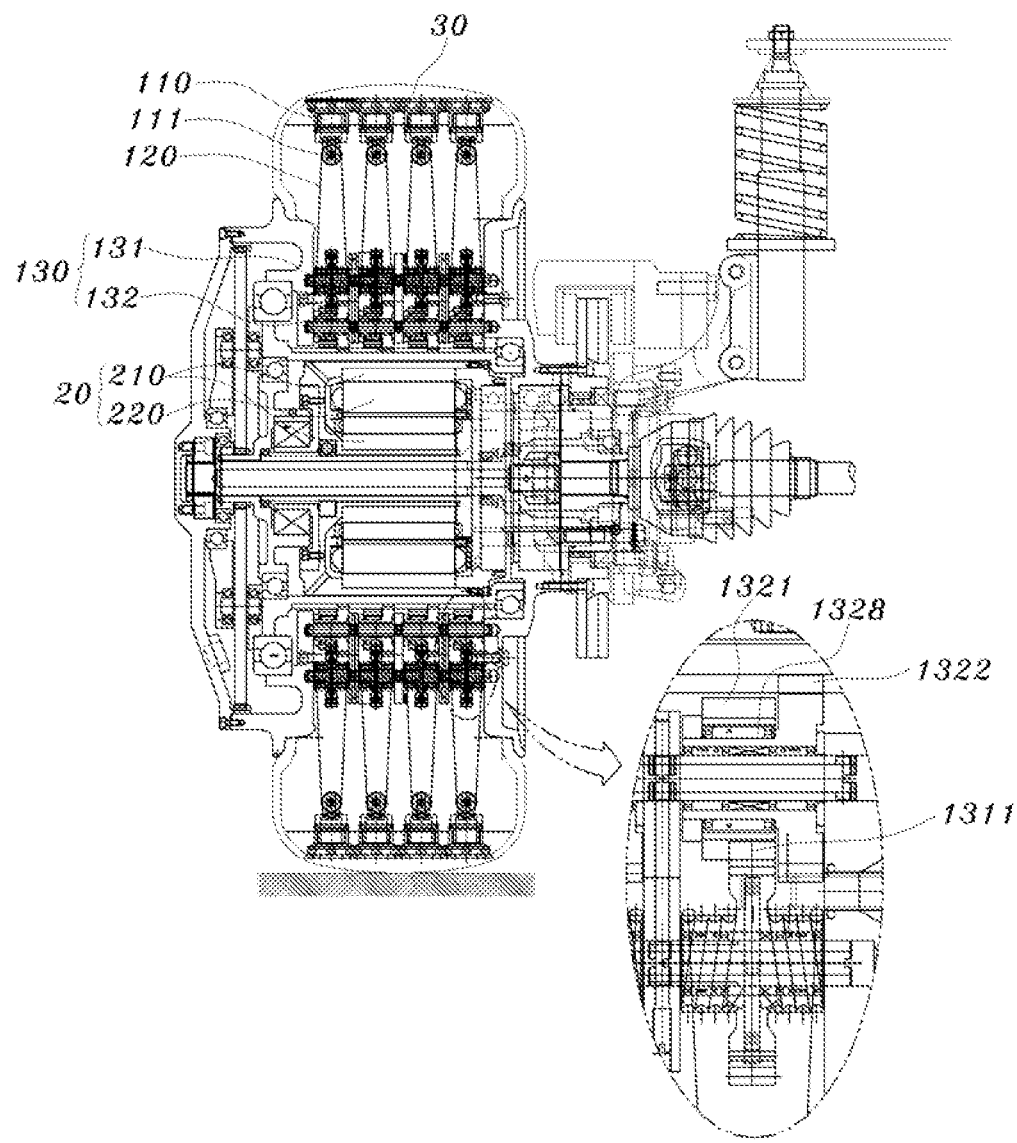
FIG. 2 is a vertical cross-sectional of the electricity generation system of FIG. 1.

The spike 110 is coupled to the tire 30 to operate with deformation of the tire 30. As shown in FIG. 1, etc., the spike 110 has a first end coupled to the inner side of the tire 30 and a second end protruding in the tire 30 and each may include a wire support 111 that allows the load transmission member 120 wound around the spike 110 to be easily turned and pulled by the spike 110 when the tire 30 expands, which will be described below. As shown in FIG. 2, etc., the load transmission member 120 is wound the spike 110 with a first end fixed and wound around a first winding portion 1312 of a load-driven rotor 131 to be described below and a second end fixed and wound around a second winding portion 1322 of the load-driven rotor 131. The load transmission member 120 held by the spike 110 easily turns through the spike 110 at the wire support 111, and the spike 110 pulls the load transmission member 120 through the wire support 111 when the tire 30 expands. The operation will be described below. The spike 110, which is coupled to the tire 30, as described above, reciprocates radially in the tire 30 when the tire 30 repeats compressing and expanding while a vehicle is driven, and the reciprocating motion of the spikes 110 is transmitted to the rotary unit 130 through the load transmission member 120.

The load transmission member 120 is provided to transmit the motion of the spike 110 to the rotary unit 130. As shown in FIG. 1, etc., the load transmission member 120 is disposed between the spike 110 and the rotary unit 130 and connected to the spike 110 and the rotary unit 130, respectively. Accordingly, the load transmission member 120 transmits the motion of the spike 110, which reciprocates radially (including front-rear and left-right deformation directions of the tire 30) with repeated compression and expansion of the tire 30 while the vehicle is driven, to the rotary unit 130. A wire may be used as an embodiment of the load transmission member 120. The load transmission wire 120 may be wound around the spike 110 with a first end fixed to a first side of the load-driven rotor 131 and a second end fixed to a second side of the load-driven rotor 131. The detailed configuration and operation of the load transmission member 120 will be described below.

The rotary unit 130 transmits a driving force to the electricity generation mechanism 20 by rotating with the motion of the spike 110 transmitted through the load transmission member 120. That is, the rotary unit 130 rotates the permanent magnets 210 or the coil 220 of the electricity generation mechanism 20 by converting the motion of the spike 110 transmitted through the load transmission member 120 into a rotary motion so that the electricity generation mechanism 20 can generate electricity.

Meanwhile, in the electricity generation system of the present invention, the driving mechanism 10 can convert only the deformation due to compression and expansion of the tire 30 into a driving force so that the driving force can be used for electricity generation. When the tire 30 is compressed while a vehicle is driven, the portion of the tire that comes in contact with the ground in the traveling direction of the vehicle is compressed by the weight of the vehicle, and when the deformation due to the compression of the tire 30 is converted into a driving force, the driving performance of the vehicle is adversely affected, that is, the vehicle consumes more energy to keep running at the same speed. However, since the electricity generation system of the present invention converts only the deformation due to expansion after the compression of the tire 30 into a driving force while the vehicle is driven, it is possible to efficiently generate electricity without deteriorating the driving performance of the vehicle.

For this purpose, the rotary unit 130 may include: a load-driven rotor 131 that is coupled to the first end of the load transmission member 120 to rotate in two directions with the operation of the load transmission member 120; and a rotary gear set 132 that is engaged with the load-driven rotor 131. The rotary gear set 132 includes a first rotary gear 1321 that rotates with the load-driven rotor 131 and a second rotary gear 1322 that is rotated by torque from the first rotary gear 1321. The first rotary gear 1321 may be configured not to rotate the second rotary gear 1322 when the tire compresses and the load-driven rotor 131 is rotated with the load transmission member 120, but to rotate with the second rotary gear 1322 when the tire expands and the load-driven rotor 131 is rotated with the load transmission member 120.

Figure 3:
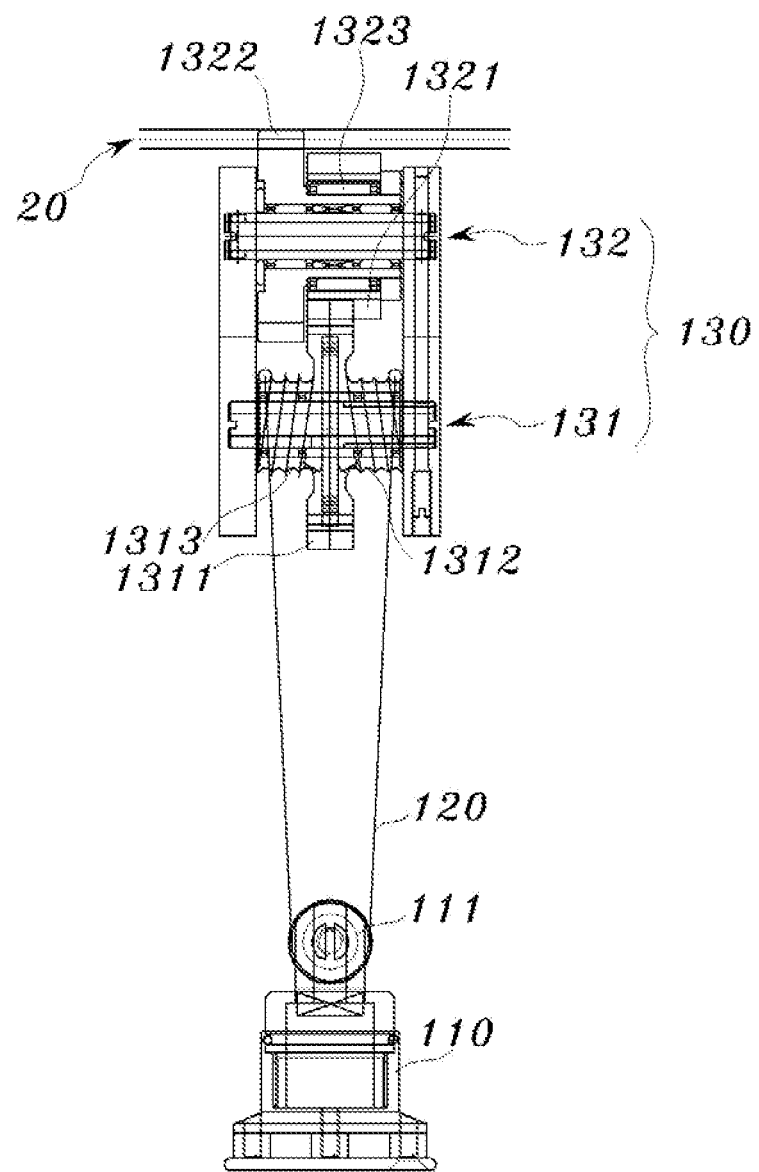
FIG. 3 is a view showing in detail the coupling relationship of a spike, a load transmission member, and a rotary unit shown in FIG. 2.
Figure 4:
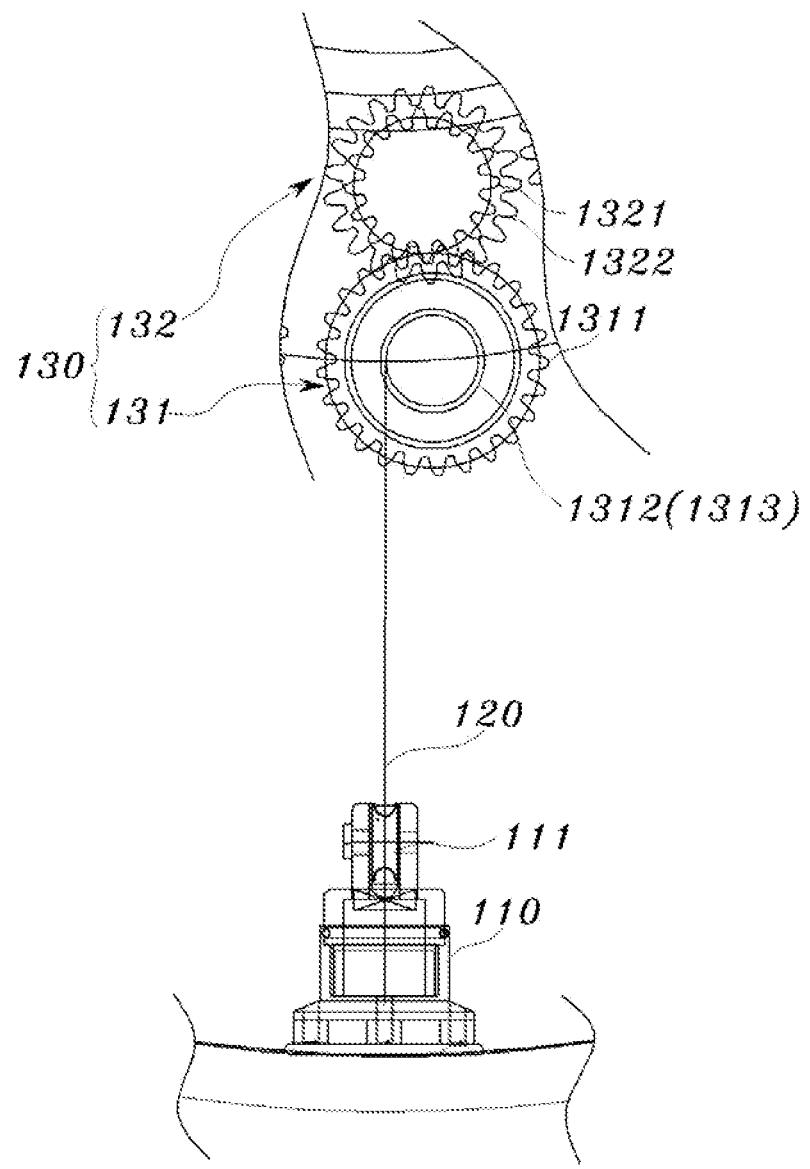
FIG. 4 is a view showing in detail the coupling relationship of the spike, the load transmission member, and the rotary unit seen in the transverse direction.

The load-driven rotor 131 is connected to the first end of the load transmission member 120 to convert the reciprocating motion of the load transmission member 120 (in detail, the spike 110) into a rotary motion. As shown in FIG. 3, etc., the load-driven rotor 131 may have a first winding portion 1312 and a second wing portion 1313 formed at both sides of a gear portion 1311 at the center to fix and wind the first end and the second end of the load transmission wire 120.

The first end of the load transmission wire 120 is fixed and wound around the first winding portion 1312 in a first direction (for example, counterclockwise) and the second end of the load transmission wire 120 is also fixed and wound around the second winding portion 1313 in the first direction (for example, counterclockwise). Accordingly, when the tire 30 compresses, the load-driven rotor 131 rotates always in the same direction (for example, clockwise) and winds the load transmission wire 120 to reduce the gap between the spike 110 and the load-driven rotor 131 with the load transmission wire 120 tensed.

Figure 6:
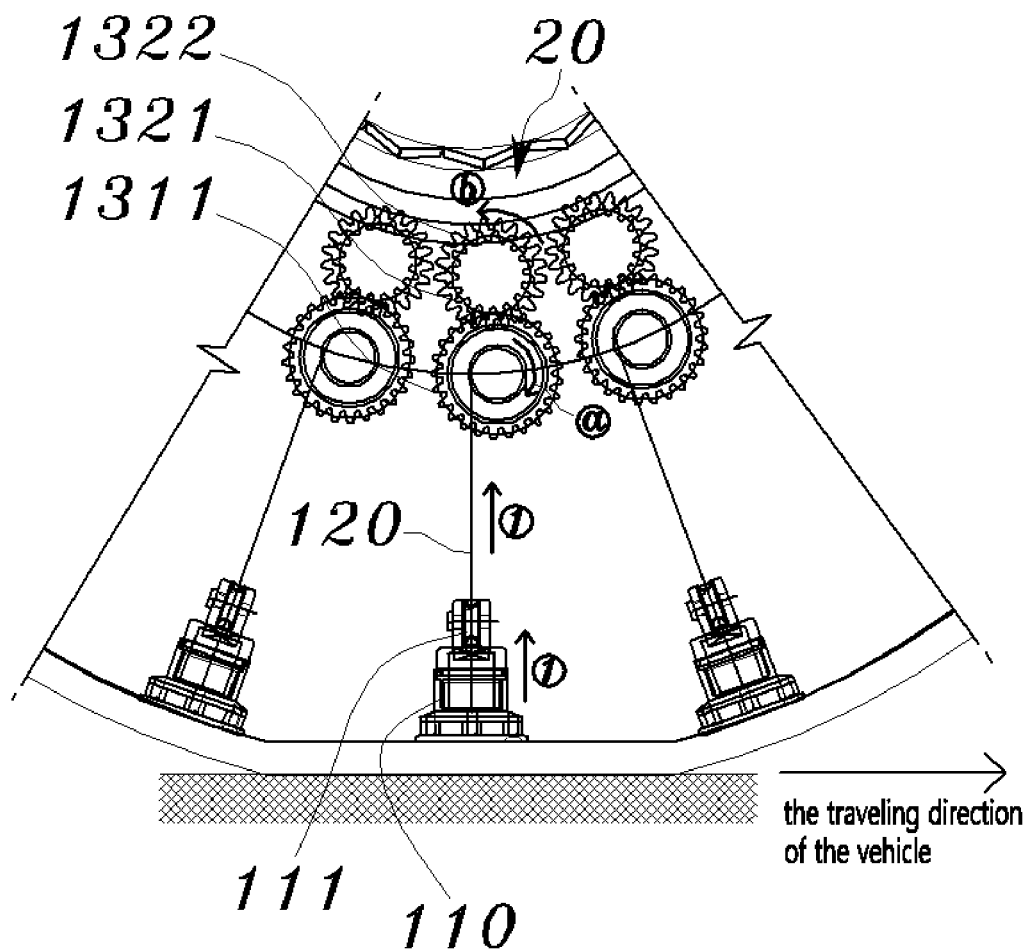
FIG. 6 is a view showing the relationship of a spike, a load transmission member, and a rotary unit when a tire compresses.
Figure 7:
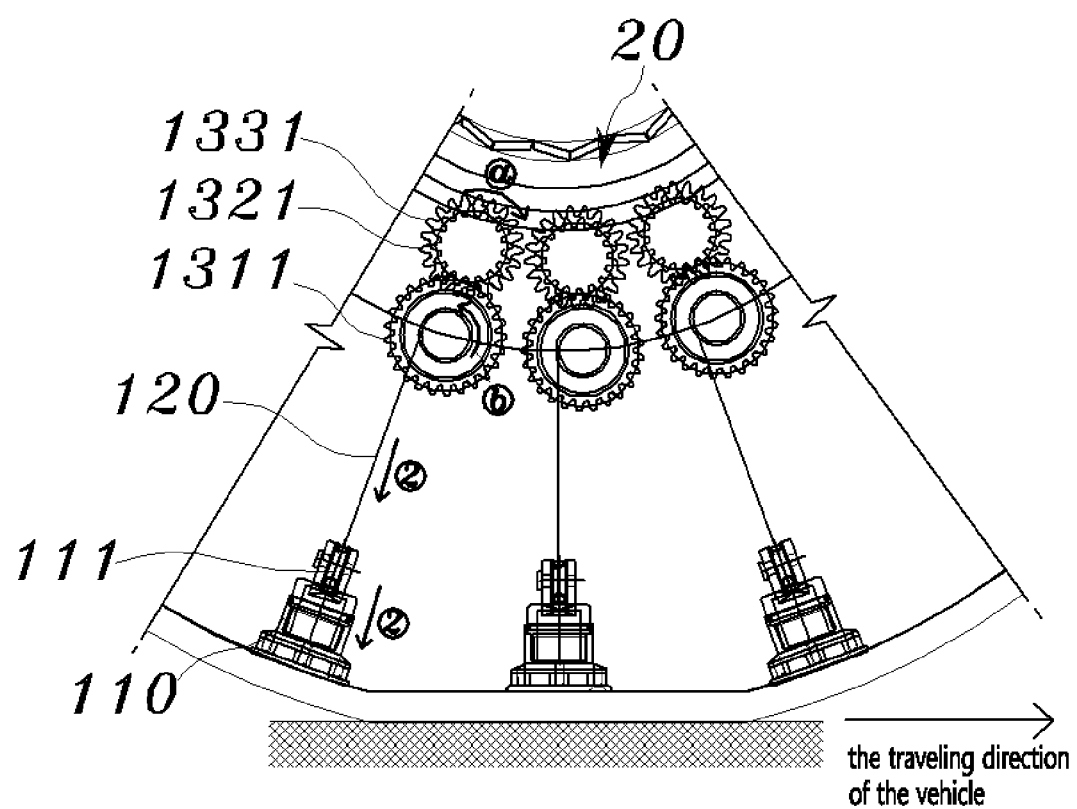
FIG. 7 is a view showing the relationship of a spike, a load transmission member, and a rotary unit when a tire expands.

In detail, referring to FIG. 6, when the tire 30 compresses by coming in contact with the ground while a vehicle is driven, the spike 110 is first moved toward the center of the tire 30 radially (in the direction ①) due to the compression of the tire 30 and the load-driven rotor 131 is rotated in a first direction (the direction ⓐ) (for example, clockwise) by elasticity of an elastic member 1314 to be described below and winds the load transmission wire 120, so the gap between the spike 110 and the load-driven rotor 131 is reduced with the load transmission wire 120 tensed. Referring to FIG. 7, when the vehicle keeps running and the compressed portion of the tire 30 expands, the spike 110 is moved back (in the direction ②) toward the edge of the tire 30 by the expansion of the tire 30 and pulls the load transmission wire 120 through the wire support 111. Accordingly, the load-driven rotor 131 is rotated in a second direction (the direction ⓑ) (for example, counterclockwise) by the pulled load transmission wire 120 and releases the load transmission wire 120 wound around it, so the gap between the spike 110 and the load-driven rotor 131 is increased (in which, the elastic member 1314 compresses when the load-driven rotor 131 is rotated in the second direction, which will be described below).

Figure 5:
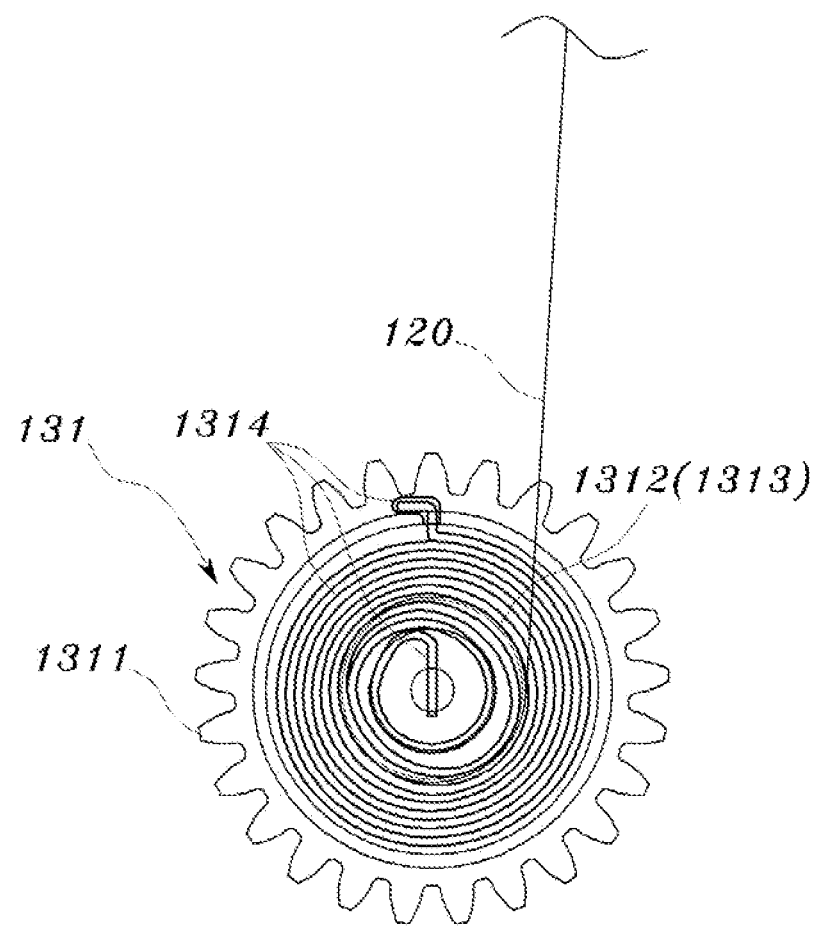
FIG. 5 is a cross-sectional view showing an elastic member in a load-driven rotor.

As described above, the load-driven rotor 131 includes the inside or outside the elastic member 1314 that provides torque so that the load-driven rotor 131 can wind the load transmission wire 120 by rotating in the first direction when the tire 30 compresses and the elastic member 1314. The elastic member may be, for example, a coiled spring, as shown in FIG. 5. The elastic member 1314 compresses when the tire 30 expands and the load transmission wire rotates the load-driven rotor 131 in the second direction (direction ⓑ), as shown in FIG. 7, and it rotates the load-driven rotor 131 in the first direction (the direction ⓐ) by elastically returning when the tire 30 compresses, as shown in FIG. 6.

The rotary gear set 132, which is engaged with the load-driven rotor 131 to rotate together it, is characterized by transmitting one-directional torque to the electricity generation mechanism 20 only when the tire 30 expands, unlike the load-driven rotor 130 that rotates in two directions when the tire 30 compresses and expands. To this end, the rotary gear set 132, for example, includes the first rotary gear 1321 that rotates with the load-driven rotor 131 and the second rotary gear 1322 that is rotated by torque from the first rotary gear 1321. The first rotary gear 1321 may be configured not to rotate the second rotary gear 1322 when the tire compresses and the load-driven rotor 131 is rotated with the load transmission member 120, but to rotate with the second rotary gear 1322 when the tire expands and the load-driven rotor 131 is rotated with the load transmission member 120.

In detail, as shown in FIG. 3, the first rotary gear 1321 that is in engaged with the gear portion 1311 of the load-driven rotor 131 and the second rotary gear 1322 share one rotary shaft and a one-way bearing 1323 is disposed between the first rotary gear 1321 and the second rotary gear 1322. Accordingly, when the first rotary gear 1321 rotates in the first direction, the second rotary gear 1322 does not rotate, but when the first rotary gear 1321 rotates in the second direction, the second rotary gear 1322 can rotate with the first rotary gear 1321. That is, as shown in FIG. 6, when the tire 30 compresses and the spike 110 moves toward the center of the tire 30 in the radial direction of the tire 30 (the direction ①), the load-driven rotor 131 rotates in the first direction (the direction ⓐ) (for example, clockwise), and accordingly, the first rotary gear 1321 engaged with the gear portion 1322 of the load-driven rotor 131 rotates in the second direction (the direction ⓑ) (for example, counterclockwise) and the second rotary gear 1322 is rotated by operation of the one-way bearing 1323. However, as shown in FIG. 7, when the vehicle keeps running, the tire 30 expands, and the spike 110 moves back to the edge of the tire 30 (in the direction ②), the load-driven rotor 131 rotates in the second direction (the direction ⓑ) (for example, counterclockwise), and accordingly, the first rotary gear 1321 engaged with the gear portion 1311 of the load-driven rotor 131 rotates in the first direction (the direction ⓐ) (for example, clockwise) and the second rotary gear 1322 is also rotated in the first direction (the direction ⓐ) (for example, clockwise) by the operation of the one-way bearing 1323, so the torque is transmitted to the electricity generation mechanism 20. As described above, since the second rotary gear 1322 rotates in one direction and transmits a driving force to the electricity generation mechanism 20 by the one-way bearing 1323 only when the tire 30 expands, the electricity generation system of the present invention can efficiently generate electricity without deteriorating the driving performance of the vehicle by converting only the deformation due to expansion after compression of the tire 30 into a driving force while the vehicle is driven.

On the other hand, the first rotary gear 1321 and the second rotary gear 1322 are arranged on one rotary shaft and it may be possible to increase the rotational speed of the second rotary gear 1322 by making the diameter of the second rotary gear 1322, which is rotated by torque from the first rotary gear 1321 to transmit a driving force to the electricity generation mechanism 20, larger than the diameter of the first rotary gear 1321 that rotates with the load-driven rotor 131. That is, the second rotary gear 1322 sharing a rotary shaft with the first rotary gear 1321 rotates one revolution when the first rotary gear 1321 rotates one revolution. However, when the second rotary gear 1322 is increased in diameter lager than the first rotary gear 1321, the rotational speed of the edge of the second rotary gear 1322 becomes higher than the rotational speed of the edge of the first rotary gear 1321. Accordingly, the electricity generation mechanism 20 that receives a driving force through the teeth on the second rotary gear 1322 receives the driving force at a higher speed.

Figure 8:
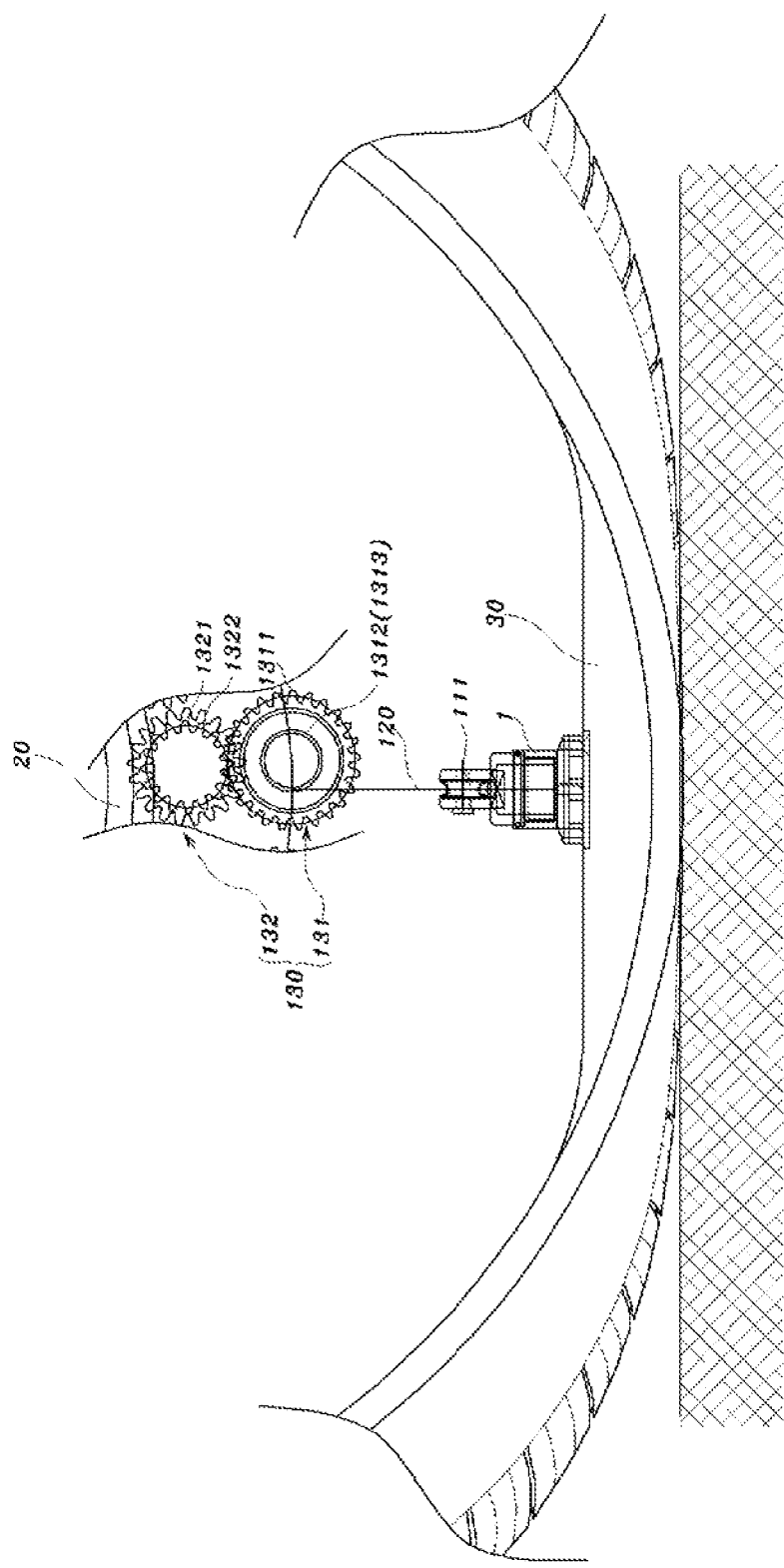
FIG. 8 is a view showing a load transmission member when the air pressure of a tire is low or a tire is punctured.

The first winding portion 1312 and the second winding portion 1313 of the load-driven rotor 131 can wind the load transmission wire 120 even though the spike 110 and the load-driven rotor 131 come close to each other such that they almost come in contact with each other, for example, the tire 30 is punctured, so it is possible to prevent damage to the spike 110, the rotary unit 130, and the electricity generation mechanism 20. That is, under unexpected situations, for example, when the air pressure of the tire 30 is too low or the tire 30 is punctured, the internal pressure of the tire 30 reduces, so the spike 110 moves toward the center of the tire 30 into the rim of the wheel, as shown in FIG. 8, and it may almost come in contact with the load-driven rotor 131. In this case, if the first winding portion 1312 and the second winding portion 1313 cannot further wind the load transmission wire 120, the load transmission wire 120 is loosened and may by unexpectedly damaged or unwound from the wire support 111 of the spike 110, whereby other parts may be damaged. However, according to the present invention, the first winding portion 1312 and the second winding portion 1313 can maximally wind the load transmission wire even under such circumstances, so it is possible to prevent damage to the load transmission wire or other parts, or prevent malfunction of the system by keeping the load transmission wire 120 tensed even under unexpected situations, for example, if the tire 30 is punctured.

Although various embodiments of the present invention by the applicant(s) were described above, the embodiments are just examples for achieving the spirit of the present invention and any modifications and changes should be construed as being included in the scope of the present invention as long as they can achieve the spirit of the present invention.

The invention claimed is:

1. An electricity generation system using tire deformation, the system comprising:
   driving mechanisms converting deformation of a tire into a driving force; and
   an electricity generation mechanism generating electricity using the driving force converted by the driving mechanisms, wherein the driving mechanisms convert only deformation due to expansion after compression of the tire into the driving force;
   wherein the driving mechanisms each include: a spike coupled to the tire to operate with deformation of the tire; a load transmission member transmitting a motion of the spike to a rotary unit; and the rotary unit transmitting a driving force to the electricity generation mechanism by rotating with the motion of the spike transmitted through the load transmission member;
   wherein the rotary unit transmits a driving force to the electricity generation mechanism through a rotary gear set that is not operated with a motion of the spike when the tire compresses, but is operated by a motion of the spike only when the tire expands;
   wherein the load transmission member is a load transmission wire that is wound around the spike with a first end fixed to a first side of the load-driven rotor and a second end fixed to a second side of the load-driven rotor.

2. The system of claim 1, wherein the rotary unit includes: a load-driven rotor coupled to a first end of the load transmission member to rotate in two directions with the load transmission member; and the rotary gear set engaged with the load-driven rotor to rotate together, the rotary gear set includes a first rotary gear rotating with the load-driven rotor and a second rotary gear rotated by torque from the first rotary gear, and the first rotary gear does not rotate the second rotary gear when the tire compresses and the load-driven rotor is rotated with the load transmission member, but rotates with the second rotary gear when the tire expands and the load-driven rotor is rotated with the load transmission member.

3. The system of claim 2, wherein a one-way bearing is disposed between the first rotary gear and the second rotary gear, so when the first rotary gear rotates in a first direction, the second rotary gear does not rotate, but when the first rotary gear rotates in a second direction, the second rotary gear also rotates with the first rotary gear.

4. The system of claim 3, wherein the first rotary gear and the second rotary gear are arranged on one rotary shaft, and a rotational speed of the second rotary gear is increased by making a diameter of the second rotary gear, which is rotated by torque from the first rotary gear to transmit a driving force to the electricity generation mechanism, larger than a diameter of the first rotary gear that rotates with the load-driven rotor.

5. The system of claim 1, wherein the spike includes a wire support that allows the load transmission wire wound around the spike to be easily turned and pulled by the spike when the tire expands, and the load-driven rotor has a first winding portion and a second wing portion formed at both sides of a gear portion at a center thereof to fix and wind the first end and the second end of the load transmission wire.

6. The system of claim 5, wherein the first end of the load transmission wire is fixed to and wound in a first direction around the first winding portion and the second end of the load transmission wire is fixed to and wound in the first direction around the second winding portion, so when the tire compresses, the load-driven rotor rotates always in the same direction and winds the load transmission wire to reduce a gap between the spike and the load-driven rotor with the load transmission wire tensed.

7. The system of claim 6, the load-driven rotor includes an elastic member that provides torque so that the load-driven rotor can wind the load transmission wire by rotating in the first direction when the tire compresses.

8. The system of claim 7, wherein the elastic member compresses when the tire expands and the load transmission wire rotates the load-driven rotor in the second direction, and rotates the load-driven rotor in the first direction by elastically returning when the tire compresses.

9. The system of claim 6, wherein the first winding portion and the second winding portion can wind the load transmission wire even though the spike and the load-driven rotor come close to each other, thereby preventing damage to the spike, the rotary unit, or the electricity generation mechanism even if the tire is punctured.

* * * * *